United States Patent
Kratochvil et al.

(10) Patent No.: US 10,337,686 B2
(45) Date of Patent: Jul. 2, 2019

(54) HEADLIGHT FOR A VEHICLE

(71) Applicant: Varroc Lighting Systems, s.r.o., Senov u Noveho Jicina (CZ)

(72) Inventors: Jan Kratochvil, Horka-Domky (CZ); Dana Pekarkova, Valasske Mezirici (CZ); Radek Orlita, Novy Jicin (CZ)

(73) Assignee: VARROC LIGHTING SYSTEMS, S.R.O., Senov U Noveho (CZ)

( * ) Notice: Subject to any disclaimer, the term of this patent is extended or adjusted under 35 U.S.C. 154(b) by 0 days.

(21) Appl. No.: 15/787,865

(22) Filed: Oct. 19, 2017

(65) Prior Publication Data

US 2018/0106454 A1  Apr. 19, 2018

(30) Foreign Application Priority Data

Oct. 19, 2016 (CZ) .................................... 2016-655

(51) Int. Cl.
*F21S 41/36* (2018.01)
*F21S 41/40* (2018.01)
(Continued)

(52) U.S. Cl.
CPC ............. *F21S 41/36* (2018.01); *F21S 41/148* (2018.01); *F21S 41/25* (2018.01); *F21S 41/285* (2018.01);
(Continued)

(58) Field of Classification Search
CPC .......... F21S 41/285; F21S 41/36; F21S 41/40; F21S 48/1225; F21S 48/1388; F21S 48/14; G02B 27/30
(Continued)

(56) References Cited

U.S. PATENT DOCUMENTS 5,829,870 A  11/1998 Remillard et al.
6,019,492 A  2/2000 Ikegaya et al.
(Continued)

FOREIGN PATENT DOCUMENTS

DE  3826330 A1  2/1990
DE  19745787 A1  5/1998
(Continued)

OTHER PUBLICATIONS

Search Report Completed Nov. 11, 2016 in Corresponding Czech Application No. PV 2016-655 (3 pages).

*Primary Examiner* — Seung H Lee
(74) *Attorney, Agent, or Firm* — Hovey Williams LLP

(57) ABSTRACT

A headlight for a vehicle with a projector includes a reflector, a light source, a diaphragm, and a collimating optical element. The reflector includes a bowl-shaped reflective surface, which presents the shape of a concave curve in a cross-section formed by a vertical plane passing through the optical axis of the projector. The light source is positioned substantially at the source focal point of the curve. The diaphragm is positioned substantially at the image focal point of the curve to create a light-darkness boundary in front of the vehicle. The optical element is for collimation of the output light beam into the required direction. The diaphragm is made of a transparent material and includes one or more optical surfaces arranged to direct those rays that have fallen onto it and passed through it to the collimating element directly, or through a supplementary optical element.

20 Claims, 4 Drawing Sheets

Figure 1:
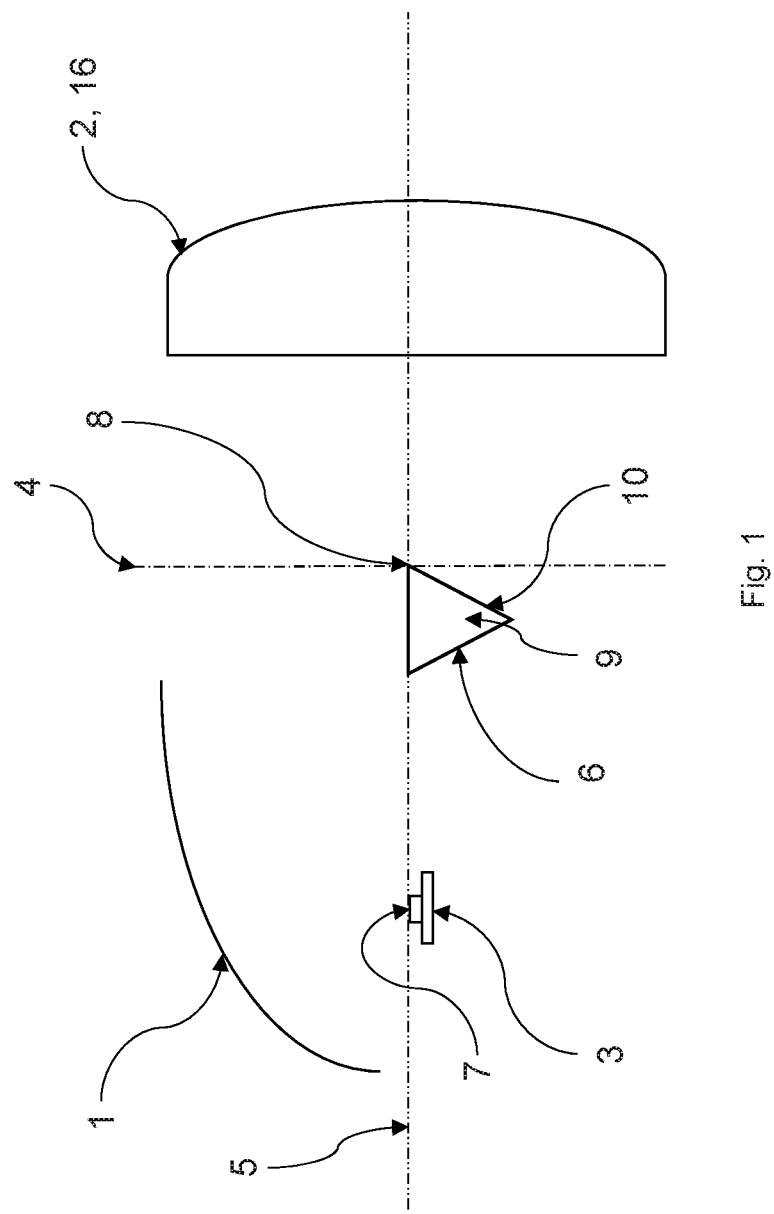

(51) Int. Cl.
*F21S 41/20* (2018.01)
*G02B 27/30* (2006.01)
*F21S 41/25* (2018.01)
*F21S 41/43* (2018.01)
*F21S 41/365* (2018.01)
*F21S 41/148* (2018.01)
*G02B 19/00* (2006.01)

(52) U.S. Cl.
CPC ............. *F21S 41/365* (2018.01); *F21S 41/40* (2018.01); *F21S 41/43* (2018.01); *G02B 19/0028* (2013.01); *G02B 19/0047* (2013.01); *G02B 27/30* (2013.01)

(58) Field of Classification Search
USPC .......................................................... 362/516
See application file for complete search history.

(56) References Cited

U.S. PATENT DOCUMENTS

| | | | |
|---|---|---|---|
| 6,827,473 | B2 | 12/2004 | Kobayashi |
| 6,991,354 | B2* | 1/2006 | Brandenburg ........ F21S 41/147 362/545 |
| 7,387,413 | B2* | 6/2008 | Brinkmann ............. F21V 5/002 362/460 |
| 8,851,726 | B2* | 10/2014 | Matsumoto .......... F21S 48/1172 362/518 |
| 2005/0225999 | A1* | 10/2005 | Bucher ..................... F21V 9/04 362/539 |
| 2017/0328533 | A1* | 11/2017 | Ko ....................... B60Q 1/0076 |
| 2017/0343179 | A1* | 11/2017 | Gurevich ............ F21S 48/1388 |

FOREIGN PATENT DOCUMENTS

| | | |
|---|---|---|
| GB | 2221526 A | 2/1990 |
| JP | 2001060403 A | 3/2001 |
| WO | 2008/022115 A2 | 2/2008 |
| WO | 2008/022115 A3 | 2/2008 |

\* cited by examiner

HEADLIGHT FOR A VEHICLE

CROSS REFERENCE TO RELATED APPLICATION

This Application claims priority of Czech Republic Patent Application No. PV 2016-655, filed Oct. 19, 2016, which is hereby incorporated in its entirety by reference herein.

BACKGROUND

1. Field

Embodiments of the present invention relate to a headlight for a vehicle and especially to a solution of the issue of reducing the intensity of the light pattern of the headlight and shielding of heat produced by the rays of the light source by reflection from the reflector surface, with the use of a diaphragm and a collimating optical element.

2. Discussion of Prior Art

Headlights of the projector type comprise at least one light source, a reflector with a bowl-shaped inner surface to reflect rays of the light source, a reflective diaphragm with a trim edge for trimming of light rays and an output lens for the output of light rays from the headlight and creation of the light pattern on the display surface.

A problem of the above-mentioned headlights of motor vehicles is that the edges of the light pattern created by the headlight on the display surface are wide and fuzzy. A different refraction of light passing through the top and bottom part of the lens influences the color characteristics of the light/darkness transition and the transitional line of the light and darkness boundary is wide with fuzzy edges, which is manifested as lower efficiency of the optical system. What happens in headlights of the said type is that the said diaphragm is primarily designed to create the light/darkness boundary.

In the prior art, a design of a light device for motor vehicles is known e.g. from the document WO2008022115A3 that is adapted to provide various light functions the diaphragm of which does not only shape the light trace, but is also used to act as a shield against heat.

The document U.S. Pat. No. 6,827,473B2 and the document JP2001060403A disclose a non-transparent diaphragm that only transmits infrared radiation to provide the night vision function.

A disadvantage of the above-mentioned prior art designs is the fact that the diaphragm shaping the visible beam primarily prevents the light from falling into the undesired area, but this portion of light remains unused, which leads to a reduction of the overall efficiency of the system.

The aim of the invention is to eliminate or significantly reduce the disadvantages of the prior art solution.

SUMMARY

The following brief summary is provided to indicate the nature of the subject matter disclosed herein. While certain aspects of the present invention are described below, the summary is not intended to limit the scope of the present invention.

A first aspect of the present invention concerns a headlight for a vehicle with a projector. The headlight broadly includes a reflector, a light source, a diaphragm, and a collimating optical element. The reflector includes a bowl-shaped reflective surface, which presents the shape of a concave curve in a cross-section formed by a vertical plane passing through the optical axis of the projector. The light source is positioned substantially at a source focal point of the curve. The diaphragm is positioned substantially at an image focal point of the curve to create a light-darkness boundary in front of the vehicle. The optical element is for collimation of the output light beam into the required direction, wherein the diaphragm is made of a transparent material. The diaphragm includes one or more optical surfaces adapted to direct rays that have fallen onto it and passed through to the collimating element directly, or through a supplementary optical element.

In one of preferred embodiments, the optical surfaces include a reflective optical surface and/or a refractive optical surface.

In another preferred embodiment, the diaphragm includes a reflective optical surface and a refractive optical surface. The optical surfaces are arranged to reflect rays that fall onto the reflective optical surface onto the refractive optical surface. The optical surfaces are adapted to direct rays exiting out of the diaphragm through the refractive optical surface, to the collimating optical element.

In another preferred embodiment, shape of the diaphragm is at the same time adapted to achieve the desired final shape of the light trace produced by the headlight.

The diaphragm is preferably made of glass, polycarbonate (PC) or polymethyl methacrylate (PMMA).

At least one of the rays produced by the light source pass through the collimating optical element without passing through the diaphragm.

At least one of the rays produced by the light source form the light-darkness boundary.

In one of preferred embodiments, the collimating optical element is includes a condenser lens with an optical plane. The optical plane passes substantially through the image focal point of the curve.

In another one of preferred embodiments, the collimating optical element is includes a reflector with a focal point. The focal point lies substantially in the location of the image focal point of the curve.

The supplementary optical element may include a reflector.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Figure 2:
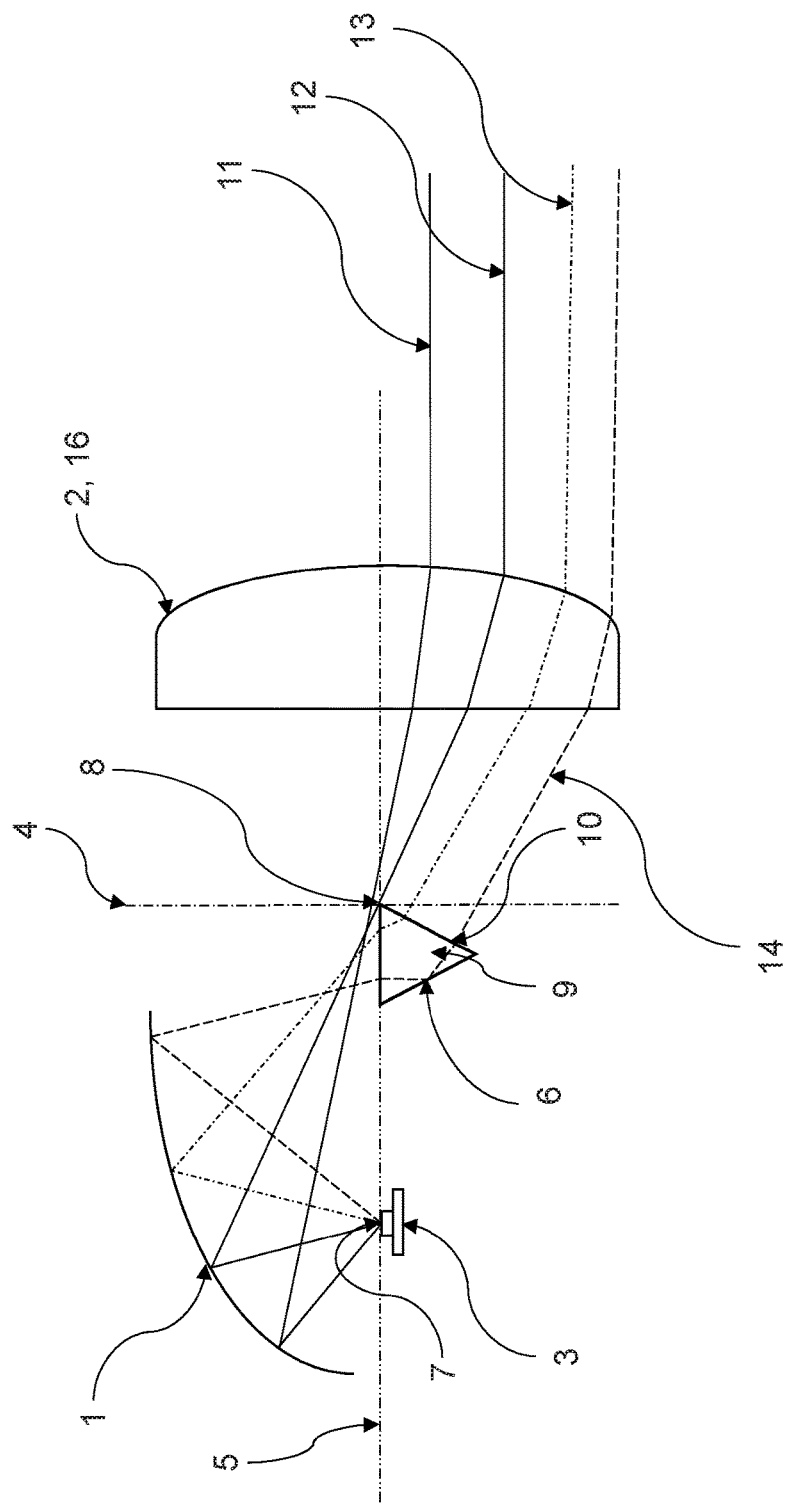
Figure 3:
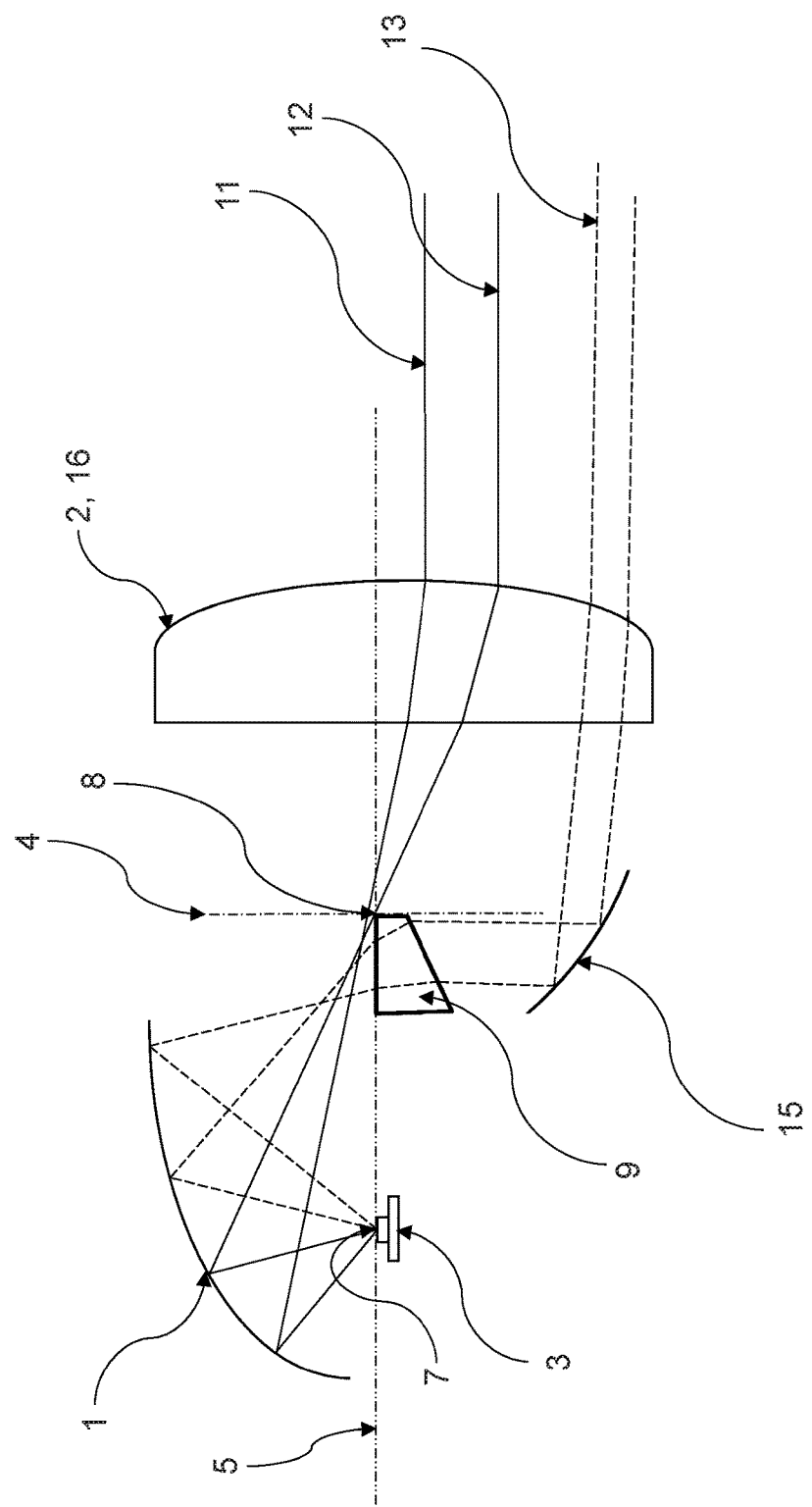
Figure 4:
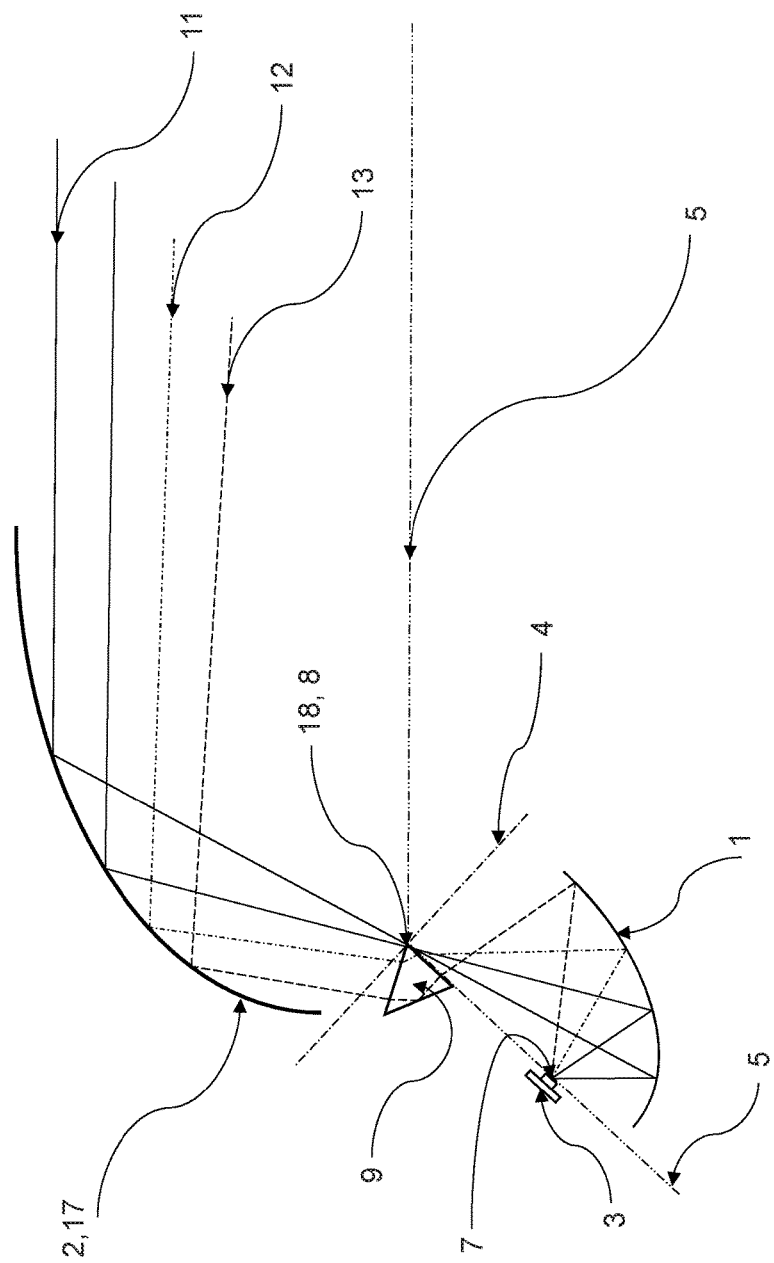

Preferred embodiments of the invention are described in detail below with reference to the attached drawing figures, wherein:

FIG. 1 schematically shows a cross-section through the projector of the headlight formed by a vertical plane according to the first embodiment of the invention, FIG. 2 schematically shows the paths of rays emitted by the light source of the embodiment of the headlight of FIG. 1, FIG. 3 schematically shows a cross-section through the projector of the headlight by a vertical plane according to the third embodiment of the invention, and FIG. 4 schematically shows a cross-section through the fourth embodiment of the invention by a vertical plane.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

FIG. 1 schematically shows a cross-section through the projector of the headlight by a vertical plane according to the first embodiment of the invention. The headlight comprises a projector that has a reflector with a bowl-shaped reflective surface that has the shape of a concave curve 1 in a cross-section by a vertical plane passing through the optical axis 5 of the projector. The light source 3 is generally substantially (exactly or approximately) positioned at the source focal point 7 of the curve 1. The diaphragm 9 is generally substantially (exactly or approximately) positioned at the image focal point 8 of the curve 1 and is used to create the light-darkness boundary in front of the vehicle. The headlight further contains a collimating optical element 2 to collimate the output light beam to the required direction. The diaphragm 9 is made of a transparent material and is adapted to direct light rays 13, 14 that have fallen onto it and passed through it, directly to the collimating optical element 2.

FIG. 2 schematically shows the paths of rays 11, 12, 13 and 14 emitted by the light source 3 of the first embodiment of the headlight shown in FIG. 1. The rays 11, 12 shown fall onto the collimating optical element 2, which is a condenser lens 16 whose focal plane 4 virtually passes through the image focal point 8 of the curve 1 without having previously passed through the diaphragm 9. The rays 12 form the light-darkness boundary at the same time.

The diaphragm 9 comprises a reflective optical surface 6 and a refractive optical surface 10 that direct the rays 13 and 14 to the condenser lens 16. This way, the rays 13 and 14 are made use of, which increases the overall efficiency of the system because this part of light is not lost.

FIG. 3 schematically shows a cross-section through the projector of the headlight by a vertical plane according to the third embodiment of the invention. In this embodiment, a diaphragm 9 of a different shape is used than in the first embodiment, and in addition, a supplementary optical element 15 is used that directs the rays 13 and 14 that have previously passed through the diaphragm 9 to the collimating optical element 2, which is a condenser lens 16 in this case whose focal plane 4 virtually passes through the image focal point 8 of the curve 1. In the displayed embodiment, the supplementary optical element 15 is a reflector, but it can also be another suitable optical element that directs the rays 13 and 14 that have previously passed through the diaphragm 9 to the condenser lens 16.

FIG. 4 schematically shows a cross-section through the fourth embodiment of the invention by a vertical plane. This embodiment mainly differs from the previous embodiments in that the collimating optical element 2 that is used in this embodiment is a reflector 17. The image focal point 8 of the curve 1 is virtually identical with the focal point of the reflector 17 in this embodiment. Again, the use of the diaphragm 9 makes sure that the rays 13 and 14 that have previously passed through the diaphragm 9 are directed to the reflector 17, which collimates the output rays 11, 12, 13 and 14 to the required direction. It means that the rays 13 and 14 are used again, which increases the optical efficiency of the system.

The diaphragm 9 is preferably made of glass, polycarbonate (PC), polymethyl methacrylate (PMMA) or another suitable material.

Besides meeting the above mentioned purpose, the diaphragm 9 can also be configured in such a way as to shape the light pattern created by the rays 13 and 14 exiting out of the diaphragm 9 to achieve the desired final shape of the light trace produced by the headlight.

The invention is not restricted to the above-described preferred embodiments, but it also comprises all modifications that fall within its scope defined by the attached patent claims.

LIST OF REFERENCE MARKS

1—reflector curve
2—collimating optical element
3—light source
4—focal plane of the condenser lens 16
5—optical axis of the projector
6—reflective optical surface
7—source focal point of curve 1
8—image focal point of curve 1
9—diaphragm
10—refractive optical surface
11, 12, 13, 14—ray
15—supplementary optical element
16—condenser lens
17—reflector
18—focal point of the reflector 17

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A headlight for a vehicle with a projector, said projector defining an optical axis, said headlight comprising:
   a reflector including a bowl-shaped reflective surface, which presents the shape of a concave curve in a cross-section formed by a vertical plane passing through the optical axis of the projector;

a light source positioned substantially at a source focal point of the curve;

a diaphragm positioned substantially at an image focal point of the curve to create a light-darkness boundary in front of the vehicle; and a collimating optical element including a reflector with a focal point lying substantially in the location of the image focal point of the curve for collimation of the output light beam into the required direction wherein the diaphragm is made of a transparent material, said diaphragm including one or more optical surfaces arranged to direct those rays that have fallen onto the diaphragm and passed through the diaphragm to the collimating element directly, or through a supplementary optical element.

2. The headlight according to claim 1, wherein the one or more optical surfaces include a reflective optical surface and/or a refractive optical surface.

3. The headlight according to claim 2, wherein the diaphragm includes the reflective optical surface and the refractive optical surface, said optical surfaces being arranged to reflect rays that fall onto the reflective optical surface to the refractive optical surface, said optical surfaces being adapted to direct rays exiting out of the diaphragm through the refractive optical surface to the collimating optical element.

4. The headlight according to claim 3, wherein at least one of the rays produced by the light source passes through the collimating optical element without passing through the diaphragm.

5. The headlight according to claim 2, wherein the shape of the diaphragm is at the same time adapted to achieve the desired final shape of the light trace produced by the headlight.

6. The headlight according to claim 2, wherein the diaphragm is made of glass, polycarbonate or polymethyl methacrylate.

7. The headlight according to claim 2, wherein at least one of the rays produced by the light source passes through the collimating optical element without passing through the diaphragm.

8. The headlight according to claim 2, wherein at least one of the rays produced by the light source form the light-darkness boundary.

9. The headlight according to claim 2, wherein the supplementary optical element includes a reflector.

10. The headlight according to claim 1, wherein the shape of the diaphragm is at the same time adapted to achieve the desired final shape of the light trace produced by the headlight.

11. The headlight according to claim 1, wherein the diaphragm is made of glass, polycarbonate or polymethyl methacrylate.

12. The headlight according to claim 1, wherein at least one of the rays produced by the light source form the light-darkness boundary.

13. The headlight according to claim 1, wherein the supplementary optical element includes a reflector.

14. A headlight for a vehicle with a projector, said projector defining an optical axis, said headlight comprising:

a reflector including a bowl-shaped reflective surface, which presents the shape of a concave curve in a cross-section formed by a vertical plane passing through the optical axis of the projector;

a light source positioned substantially at a source focal point of the curve;

a diaphragm positioned substantially at an image focal point of the curve to create a light-darkness boundary in front of the vehicle; and a collimating optical element for collimation of the output light beam into the required direction wherein the diaphragm is made of a transparent material, said diaphragm including one or more optical surfaces arranged to direct those rays that have fallen onto the diaphragm and passed through the diaphragm to the collimating element directly, or through a supplementary optical element, wherein the supplementary optical element includes a reflector.

15. The headlight according to claim 14, wherein at least one of the rays produced by the light source passes through the collimating optical element without passing through the diaphragm.

16. The headlight according to claim 14, wherein the collimating optical element includes a condenser lens with an optical plane, said optical plane passing substantially through the image focal point of the curve.

17. The headlight according to claim 14, wherein the one or more optical surfaces include a reflective optical surface and/or a refractive optical surface.

18. The headlight according to claim 17, wherein the collimating optical element includes a condenser lens with an optical plane, said optical plane passing substantially through the image focal point of the curve.

19. The headlight according to claim 17, wherein the diaphragm includes the reflective optical surface and the refractive optical surface, said optical surfaces being arranged to reflect rays that fall onto the reflective optical surface to the refractive optical surface, said optical surfaces being adapted to direct rays exiting out of the diaphragm through the refractive optical surface to the collimating optical element.

20. The headlight according to claim 19, wherein the collimating optical element includes a condenser lens with an optical plane, said optical plane passing substantially through the image focal point of the curve.

* * * * *